United States Patent Office

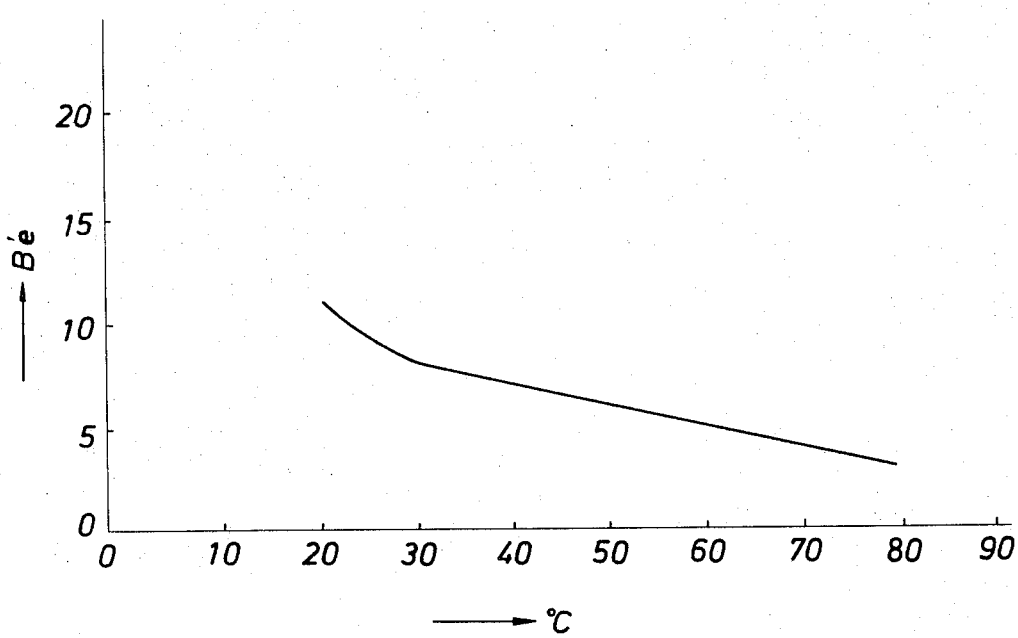

3,720,531
Patented Mar. 13, 1973

3,720,531
PROCESS FOR RECOVERING AND MANUFACTURING SILICIC ACID SYSTEM PIGMENT FROM ALKALI PROCESS PULP BLACK LIQUOR CONTAINING SILICATES
Toshiaki Makino, 360 Iwai-machi, Hodogaya-ku, Yokohama-shi, Japan
Filed Mar. 17, 1971, Ser. No. 125,083
Claims priority, application Japan, Oct. 23, 1970, 45/92,748
Int. Cl. C09c 1/30
U.S. Cl. 106—288 B    5 Claims

ABSTRACT OF THE DISCLOSURE

A process for recovering and manufacturing silicic acid system pigment from alkali process pulp black liquor containing silicates, in which when said black liquor contains water-soluble silicates, said liquor being added with at least one member selected from the group consisting of substances having stronger acidity than silicic acid, substances having stronger alkalinity than the alkali as used for digestion or their salts, and when said black liquor contains water-insoluble silicates, said liquor being added with acids or ammonium salts which produce water-soluble salts with said water-insoluble silicates or added with carbon dioxide gas, to obtain complex of silicic acid system and organic substance.

---

This invention relates to a process for recovering silicic acid and silicates characterized by decomposing silicates produced by adding one kind of substance selected from the group composed of substance with stronger acidity than silicic acid, substance with stronger alkalinity than alkali used in digestion and their salts, irrespective of before or after the digestion step when producing water-soluble silicate during manufacture of pulp by the alkali process using plant of the gramineae family containing silicic acid, for example rice straw, as raw material (referred to as the soda process hereinafter) in black liquor, that is solution of excess soluble alkali, alkali lignin salt, pyrocatechol, organic acid and sugar alcohol produced similarly by digestion, but during this reaction the black liquor is not precipitated at all but only silicic acid and silicate are precipitated in the alkaline state and separated.

This invention also relates to the process for recovering and simultaneously manufacturing silicic acid, silicate and complex of lignin substance and silicic acid which are useful as filler for rubber and also as pigment by completing the reaction by providing sufficient time with consideration given particularly to concentration of silicate, reaction temperature and addition rate of treating reagent, in the presence of absence of water soluble silicate added from outside the system.

A complex of silicate and organic substance which have precipitated after black liquor has been separated are obtained when producing aqueous insoluble silicates (referred to as the lime process hereinafter) but this invention relates to a process for obtaining complex of silicic acid and organic substance by adding acid or ammonium salt which forms soluble salt with this complex, or obtaining complex of silicic acid, calcium carbonate and organic substance by reacting with carbon dioxide gas and recovering these which have superior dispersion property and reinforcing effect as rubber filler, and a process for manufacturing these.

It is well known that silicic acid, contained in rice straw, reacts with caustic soda, soidum carbonate, sodium sulfite or slaked lime used as treating reagent in the digestion solution to produce sodium silicate and calcium silicate when manufacturing pulp from plants of the gramineae family such as rice straw by the soda process, kraft process or lime process, and also generally silicic acid, and silicate are being manufactured by decomposing sodium silicate and calcium silicate with acid or salts of metals. Also, numerous processes have been proposed for treating pulp waste liquid but it is well known in this technical field that these are not satisfactory for recovering silicate from waste liquid and have been almost completely ignored because of the difficulty in separating it from lignin.

In the present day, sodium silicate and calcium silicate existing in black liquor in pulp manufacture are not being effectively separated and utilized but are discharged as waste liquid to cause pollution problem.

The object of this invention is not only to propose a manufacture of pulp by using plants containing silicic acid such as plants of the gramineae family but also to provide a process for recovering and manufacturing silicic acid, silicates and complex of silicic acid and lignin substance which are useful as reinforcing filler for rubber and pigment for other uses.

As is well known, the product obtained by simply neutralizing alkali silicate with acid is useful as adsorbent and catalyst but this cannot be used as pigment. In view of this, previously silica gel which is useful as pigment was obtained by neutralizing in the presence of salts of alkali metal, alkali earth metal or aluminum, or surfactant to precipitate and make gelation velocity constant in order to obtain fine, homogeneous gel. Also, the temperature and time required for the gelation reaction were reduced by the presence of electrolyte. Surface treatment of the silicic acid and silicate thus obtained was carried out with organic substance such as alkali lignin, fatty acid, resin acid and higher aliphatic amine to weaken the adsorption ability of the particle surface as a means for improving their dispersion property and increasing reinforcing property for rubber.

The present inventor discovered that the black liquor obtained from pulp digestion by the alkali process, particularly alkali lignin salt, is more effective and has better ability than the above-mentioned precipitation accelerator which contains electrolyte.

That is, it is believed that sodium silicate, alkali lignin salt, caustic soda, pyrocatechol, organic acid and sugar alcohol are contained in black liquor of soda process and excess caustic soda, alkali lignin salt, pyrocatechol, organic acid and sugar alcohol present in black liquor act as precipitation accelerator or buffer solution when obtaining silicic acid and silicate by decomposing sodium silicate in black liquor by adding acidic solution, for exaple, to complete reaction by making gelation velocity constant so that the fine particles have constitutive property and become homogeneous gel which has superior dispersion property in rubber.

In case of the lime process, on the other hand, it is believed that various substances such as calcium silicate, alkali lignin salt, slaked lime and organic acids are present in the black liquor but fine, lower molecular weight organic substances in the black liquor harmonize and coprecipitate during formation of calcium silicate by reaction between slaked lime and silicic acid during digestion in the autoclave fine aggregate of calcium silicate, undissolved slaked lime and organic substances.

This invention is described further in details in the order of the lime process and soda process, and also the correlation between both processes is explained.

First, in case of the lime process, the case in which 13% slaked lime with respect to the raw material used and the case in which a small quantity of caustic soda is added to accelerate digestion so that 8% of slaked lime and 5% of caustic soda are used together are explained. The digestion condition is 10 hours at 150° C. In both cases, aggregate of calcium silicate, small quantity of undissolved slaked lime and organic substance is formed by reaction between silicic acid and slaked lime.

After digestion is completed, the black liquor is filtered to remove fine pulp particles and other foreign matters, then further concentrated to 4–6° Bé. and separated a precipitate from soluble black liquor to obtain slurry-form aggregate of fine yellowish brown particles.

This is washed with water to remove black alkali lignin salt, by which aggregate of calcium silicate which is insoluble in water, a small quantity of undissolved slaked lime and organic substance which coprecipitate is formed. Only a small quantity of soluble, black alkali lignin salt is formed if slaked lime is used independently and furthermore, a good recovery rate of yellowish brown aggregate cannot be expected. When slaked lime obtained by reacting stoichiometric quantities of caustic sola and calcium chloride is washed with water and used in digestion, reaction is accelerated because the slaked lime is in the form of fine particles so that good quality pulp is obtained and also recovery of yellowish brown aggregate is increased. When digestion is carried out with a small amount of caustic soda added to the slaked lime, the amount of soluble, black alkali lignin salt is increased considerably in accordance with the quantity used and also, recovery of the yellowish brown aggregate is very good. Also, aggregate of yellowish brown calcium silicate and organic substance is formed even when digestion is carried out by the soda process with the quantity of caustic soda increased, for example 8% caustic soda and 5% slaked lime or 10% caustic soda and 3% slaked lime.

That is, it is assumed that caustic soda and silicic acid react in the autoclave to form firstly sodium silicate and when this reacts with slaked lime to form calcium silicate, the organic substance in black, liquor harmonizes and coprecipitates and disperses on the surface to form fine aggregate.

Previously, the dispersion property was improved by surface treatment of silicates with lignin but as it is difficult to obtain fine precipitates of lignin and to obtain uniform dispersion on the surface or between particles of these inorganic substances, the reinforcing effect was not sufficient.

In the process of this invention, fine, low molecular weight organic substances dissolved in black liquor during formation of calcium silicate by the reaction between silicic acid and slaked lime when digestion is carried out for a long time in an autoclave harmonize and coprecipitate so that fine organic substances disperse and cover uniformly the surface or surface of aggregated particles or between particles. The important point is that low molecular weight organic substances which harmonize and coprecipitate during calcium silicate formation must be present.

Furthermore, digestion for a long time is necessary when using slaked lime independently or when using it together with a small quantity of magnesium in order to remove almost completely undissolved slaked lime but when digestion is carried out with addition of caustic soda, undissolved slaked lime disappears almost completely because the quantity of slaked lime is reduced to that extent. Also, the quantity of undissolved slaked lime becomes very small when colloidal slaked lime prepared by reacting caustic soda and calcium chloride is used. It is not necessary to use excess slaked lime but it is desirable to use about 1 mol of alkali earth metal oxide per 2–4 mols $SiO_2$ contained in the raw material in view of its consumption in pulp manufacture.

When the yellowish brown aggregate is washed with water and dried, it becomes a weak alkaline powder and shows reinforcing property when added to rubber-like elastomers.

When the above-mentioned slurry is reacted with acids or ammonium salts thereof such as hydrochloric acid, nitric acid, acetic acid, hypochlorous acid and ammonium chloride which form soluble salts with alkaline earth metals, or their salts the yellowish brown aggregate changes to brown and becomes finer, by which product with low apparent specific gravity and good filtering property is obtained. It is possible to obtain complex of silicic acid and organic substance or silicic acid, calcium silicate and organic substance by adjusting the reagent added. When sodium hypochlorite is added to this slurry and treated for 1–2 hours at 50° C.–80° C. and pH 4–6, the organic substance becomes soluble and can be removed to obtain white powder.

Needless to say, it is also possible to obtain complex of silicic acid, calcium carbonate and organic substance by reacting with carbon dioxide gas. Filler with superior dispersing property and reinforcing effect can be obtained from the above by washing with water and drying.

Next, manufacture of pulp by the soda process using plants containing silicic acid such as plants of the gramineae family as raw material is described in details. In this case, sodium silicate contained in black liquor produced as digestion liquid is decomposed with an acid stronger than silicic acid, alkalis such as ammonia water and lime water, salts of various metals or ammonium salts and thus only silicic acid is precipitated directly or silicate is precipitated and then silicic acid separated by acid decomposition.

Silicic acid and silicates produced not by treating black liquor containing silicate produced after pulp digestion but by adding a small quantity of above-mentioned treating reagent before digestion and digesting the raw material directly so that silicate is already decomposed in the black liquor in the autoclave can be recovered by concentrating the black liquor to 5°–10° Bé. However, the addition quantity in case the treating reagent is acidic should be such that alkali lignin salt does not precipitate. Also, the important point when producing silicate insoluble in water by this method of adding before digestion is that, when silicate insoluble in water is produced by reacting sodium silicate by adding treating reagent such as slaked lime or calcium chloride when producing calcium silicate in black liquor as mentioned above, aggregate of silicate insoluble in water and organic substance is formed by the organic substance in black liquor harmonizing and coprecipitating during its formation reaction so that after this aggregate has been separated from the black liquor, filtered and washed with water, complex of silicate and organic substance is obtained by treating with acid, ammonium salt which produce water soluble salt of said silicate or carbon dioxide gas.

In this method, separation by filtration is difficult as fine pulp particles adhere to silicic acid and silicates but the method of obtaining silicic acid and silicates by treating the black liquor after digestion is carried out after fine pulp particles and other foreign matters have been removed.

In case the solution to be added is acidic, irrespective of whether it is added before or after digestion, the final pH of the reaction mixture is made over 8 so that almost all alkali lignin salt does not react and precipitate, depending on the concentration and quantity of the acidic solution, concentration and temperature, silicate content and pH of the black liquor, and the silicates in the black liquor are separated to form silicic acid or silicates. It is difficult to separate silicic acid and silicates by filtering and water-washing once alkali lignin salt reacts and precipitates. When the solution to be added is alkaline, it is preferable to make it a stoichiometric quantity for substitution with alkali of the alkali silicate.

It is preferable to make the silicic acid content of the black liquor 10–100 g./l. If the silicic acid concentration is higher than 100 g./l., the viscosity increases and results in incompleteness of reaction and troubles in operation while on the other hand, the treating cost becomes high if the concentration is below 10 g./l.

In case of rice straw, for example, the silicic acid content is 10–12% but its content in wheat straw and reed is low so that black liquor can be used repeatedly for digestion and separation can be carried out after the concentration of silicates has increased. Also, a large quantity of superior silicic acid for pigment can be obtained by adding soluble silicates from outside the system to make its concentration 10–100 g./l.

Next, an example of comparison of various components of straws and bagasse is given. In case of rice straw, nearly 70% of the ash content is silicic acid.

| Kind | Ash | Lignin | Hemicellulose | Cross & Bevan cellulose | Cellulose |
|---|---|---|---|---|---|
| Wheat straw, percent | 6–8 | 17–19 | 27–32 | 50–54 | 33–38 |
| Rice straw, percent | 14–20 | 12–14 | 23–25 | 46–49 | 28–36 |
| Bagasse, percent | 2 | 19–21 | 30–32 | 59–62 | 40–43 |

Similar results can be obtained by carrying out beforehand hydrolysis of rice straw with acid, for example adding 3% of glacial acetic acid to the raw material, digesting for 1.5 hour at 150° C. and removing hemicellulose, and then digesting by the soda process. It is desirable to concentrate the black liquor to 7–40° Bé. That is, the higher the degree of Bé becomes, the faster the gelation velocity becomes. Also, the silicate concentratiton becomes higher as the concentration progresses when silicate content is constant and furthermore, precipitation of alkali lignin salt reacting with the acidic solution added becomes difficult and consequently the concentration of the acidic solution can be increased.

The higher the reaction temperature becomes, the faster the reaction velocity becomes.

It is desirable to react at a higher temperature if the concentration of the black liquor is low, and 5°–100° C. at normal pressure is suitable. When reaction is carried out under a high pressure, a temperature over 100° C. may be acceptable. Production of silicic acid in an autoclave after adding treating reagent before digestion is one exemplar method of this.

Although it is not necessary to use an excess of alkali, it is desirable to make the quantity of alkali metal oxide 1 mol per 2–4 mols of silicic acid $SiO_2$ contained in the raw material by taking into consideration the required quantity of alkali metal and its salt with respect to the raw material consumed for pulp manufacture. In the formula for alkali metal silicate $Me_2O(SiO_2)_n$, $n$ is 2–4 and Me is alkali metal.

With regard to the time and process required for reaction, it is preferable to carry out reaction by increasing the temperature slowly in case concentration of alkali lignin salt, concentration of silicate content and quantity of treating agent to be added are constant or by increasing the treating reagent to be added slowly in very small lots in case the concentration of alkali lignin salt, concentration of silicate content and reaction temperature are constant for obtaining pigment having superior dispersion property and constitutive property, or a compromise of both methods may be used but it is possible to obtain products which are useful as pigment by completing the reaction in 20–200 minutes using any of these methods.

However, as it will be disadvantageous industrially if the time is too long, a time indicated above is preferable.

In summarizing the above explanation, the feature of this invention is that one member of substance selected from a group composed of a substance with stronger acidity than silicic acid, a substance with stronger alkalinity than the alkali used in digestion or their salts is added to pulp digestion liquid containing silicates before or after the digestion process so that silicic acid or silicate is separated and precipitated without having almost any alkali lignin salt precipitating by taking into consideration the reaction temperature and addition rate of treating reagent with respect to the concentration and silicate content of the black liquor so that silicic acid or silicate having superior dispersion and constitutive properties are obtained by precipitating with stirring so that reaction is completed in 20–200 minutes with gelation velocity maintained constant.

In the above, substances having stronger acidity than silicic acid are carbon dioxide gas, glacial acetic acid, hydrochloric acid, hydrogen peroxide, phenol, cresol and paraformaldehyde; substances having stronger alkalinity than the alkali used for digestion are ammonia water and lime water; and salts of these are calcium chloride, aluminum sulfate, sodium hydrogen carbonate, sodium hydrogen sulfate and ammonium sulfate, for example.

Also, only a very small quantity of silicic acid precipitates with most of the alkali salts, with the exception of acidic salts. That is, silicic acid precipitates with sodium hydrogen carbonate ($NaHCO_3$) and sodium hydrogen sulfate ($NaHSO_4$) which are acidic salts of alkali salt of dibasic acid but only a very small quantity of precipitate is formed with neutral salts such as sodium carbonate ($Na_2CO_3$) and sodium sulfate ($Na_2SO_4$).

The acidity of silicic acid is shown by the following equation:

$$H_2SiO_3 \rightleftharpoons H^+ + HSiO_3^- \rightleftharpoons 2H^+ + SiO_3^{-2}(H^+)^2$$
$$= 10^{-9.8}(0.0022 + 6.6 \times 10^{-6} C \cdot S) + 10^{-14}$$

C: Concentration of silicic acid suspension
S: Specific surface area of silicic acid This invention is explained in further detail with drawing and embodiments. The drawing is an example showing the relation between the liquid temperature and Bé. when decomposing sodium silicate by the process of this invention.

13% of caustic soda to rice straw as the raw material is used, digested for 3 hours at 150° C. and the black liquor thus obtained is filtered to remove fine particles of pulp and other foreign matters.

Next, the black liquor is concentrated slowly, and each 100 cc. of black liquor in various concentrations are obtained.

Also, glacial acetic acid and water are mixed in a ratio of 1:2, carbon dioxide gas is adsorbed at 5° C. and normal pressure, and the solution obtained is made 3 cc.

The graph shows the relation between Bé. of black liquor and temperature from the reaction condition of low concentration in which silicic acid precipitates and also alkali lignin salt reacts and precipitates to the condition in which alkali lignin salt does not react and not precipitate but silicic acid is separated and precipitated when 3 cc. of acidic solution is added to 100 cc. of black liquor of various concentrations resulting from difference in concentration. That is, the higher the extent of concentration is, the higher the concentrations of alkali lignin salt, of silicate, of alkali and of organic acid in 100 cc. of black liquor become.

| | Temperature at which silicic acid precipitated | |
|---|---|---|
| Bé. of black liquor: | | |
| 3° Bé | About 80° C. | Silicic acid precipitates and alkali lignin salt discolors and also precipitates. |
| 5° Bé | About 60° C. | |
| 7° Bé | About 40° C. | Only silicic acid precipitates and alkali lignin salt does not precipitate. |
| 8° Bé | About 30° C. | |
| 9° Bé | About 25° C. | |

When silicate concentration and alkali lignin salt concentration in black liquor, and addition quantity of treating reagent are maintained constant, the entire 3 cc. of acidic solution is added to 100 cc. of 10° C., 7° Bé. black liquor and the temperature increased slowly, polymerization of silicic acid starts when the temperature becomes about 40° C. after 20 minutes, become sol form, then feather form, gels and viscosity increases gradually until it becomes possible to differentiate its condition of each easily.

When this is filtered, precipitate washed with water and dried, silicic acid powder having soft touch is obtained.

Also, in case the concentration of the black liquor and reaction temperature are set beforehand, the addition rate of the 3 cc. of acidic solution is important. For example, in case 3 cc. is to be added to 7° Bé. black liquor at 40° C., addition is carried out very slowly in small quantities with stirring so that addition of the entire quantity is completed over a period of 30 minutes. The black liquor first becomes sol form, then feather form and viscosity increases to become gel form. When this is filtered, washed with water and dried, weak alkaline, fine whitish grey powder having very soft touch is obtained and when this is suspended in water and electron photomicrograph is taken, it can be seen that this is a pigment having very superior dispersion and constitutive properties.

However, precipitate of the gel form can be formed in 2–3 minutes if the addition rate is increased but the product thus obtained is hard and when electron photomicrograph is taken, it can be seen that the dispersion property is poor, lumps have formed and constitutive property is poor. It is necessary to be careful as pigment of poor quality will be produced.

Needless to say, reaction temperature of 40°–100° C. is also suitable. The higher the reaction temperature is, the faster the reaction velocity becomes. A temperature of over 100° C. is also suitable in case of pressure being above normal pressure.

A compromise of both methods, that is increasing the addition rate of treating reagent while increasing the temperature can also be employed.

With regard to the reaction time, it is preferable to complete reaction with a time of over 20 minutes in order to obtain superior pigment if the other conditions are appropriately selected. A very long time will be disadvantageous in practice and not more than 200 minutes may be suitable. The pH of the solution was 9, which was obtained by adding the above-mentioned 3 cc. of acidic solution to 100 cc. of black liquor of 9° Bé. and pH 11.5, and after removing the precipitated silicic acid.

Also, when 8.5% of caustic soda to the raw material is used, the black liquor produced by digestion concentrated, 100 cc. of black liquor of 30° C., 8° Bé. and pH 10.5 taken and 3 cc. of the above-mentioned acidic solution is added to this, alkali lignin salt also reacts and precipitates simultaneously with precipitation of silicic acid.

It is necessary to increase or decrease the mixing ratio of glacial acetic acid and aqueous solution in accordance with the extent of concentration of black liquor and also to consider the relation between its quantity and reaction temperature so that alkali lignin salt does not react and precipitate. In experiment, several quantities of acidic solutions prepared by the above method are added to 200 cc. of 35° C., 10° Bé. black liquor, the results of which are shown in the following. 13% of caustic soda is used in the digestion step.

Addition quantity of acidic solution

| | Cc. |
|---|---|
| Alkali lignin salt solution does not discolor but is separated with black color as it is and the silicic acid becomes whitish grey when water is added and washed | 10<br>15 |
| Alkali lignin salt changes slightly to brown, a small quantity precipitates and silicic acid becomes light brown when separated and washed with water. Filterability is not so good | 20 |
| Alkali lignin salt discolors, a large quantity precipitates so that it is difficult to separate it from silicic acid | 25 |

The entire quantity of sodium silicate is not decomposed in all of the above cases but it is assumed that 90–95% decomposes. Also, a small quantity of 2–5% of dissolved alkali lignin salt and hemicellulose precipitates and adheres to silicic acid and cannot be removed by filtering and water washing, and as a result, the fine powder is colored whitish grey to brown and also, it is weak alkaline. However, as the surface of silicic acid is coated by adhered lignin, its dispersion property in rubber, etc. is very good. There is a tendency recently for carrying out surface treatment of silicic acid with high molecular weight organic compounds but this treatment is not necessary in case of the present product.

As it is desirable to reduce the sodium content to below 1.7%–1% by weight when silicic acid is to be used as pigment for rubber, etc. and also as pH of 6.0–8.5 is preferred, it is treated with an acidic solution of pH 5–7 in order to carry out filtration effectively, washed with water and dried. In view of this, the adhered lignin is not removed.

When acidic solution, for example, is added to black liquor and silicic acid precipitated without discoloring alkali lignin salt but this remains black, boiled for about 1–3 hours with stirring at 70° C.–100° C. with black liquor concentration maintained at 8° Bé.–12° Bé. by diluting with aqueous solution occasionally, the precipitate and black liquor separated by filtering, the precipitate washed with water and dried, weak alkaline light brown powder having large particle size, high bulkiness, low moisture adsorbability and good dispersion property is obtained.

This fine powder differs considerably from silicic acid and although particulars are unknown, it is believed that lignin substance and silicic acid have formed chelate compound. Also, the light brown color of this fine powder is due to a small amount of lignin which adheres to the precipitate.

Pyrocatechol and protocatechuic acid are formed by alkali fusion and it is assumed that chelate compound has formed with pyrocatechol.

This chelate compound does not indicate any change, nor does it react when acid treatment is carried out with aqueous solution of hydrochloric acid, etc. and consequently, it is believed that a compound having considerable stability has formed. An acidic product is obtained when this is washed with water and dried. This light brown powder is useful as filler for rubber.

The above product has good dispersion property in rubber as lignin adheres to the surface and in view of this, silicic acid has whitish grey to brown color, whereas the compound of lignin substance and silicic acid has light brown color. In case white product is required, a yellow solution is first obtained when treated with chlorine or a substance which produces chlorine to dissolve the lignin and white powder is obtained by filtering, washing with water and drying at 100° C. to expel chlorine. When using sodium chlorite, pH is adjusted to 5–6 with acid and temperature maintained 40°–60° C. for 2–4 hours. It can also be removed with hydrogen peroxide or substance which produces hydrogen peroxide. First, pH is made 5–6 by adding hydrochloric acid or sulfuric acid, a small quantity of hydrogen peroxide is added and treated for about 1–4 hours at a temperature of 50°–90° C. by which lignin is liberated and floats to the surface of the solution so that it can be removed and then the precipitate is washed with water and dried to obtain fine, white powder. It will be advantageous if this is carried out together with acid treatment.

Also, there is no change in the dispersion property, moisture adsorbability and bulkiness of the compound of lignin substance and silicic acid even if it is made fine white powder by removing the lignin.

In case fine pulp particles become mixed in the silicic acid suspension and cannot be removed by filtering and water-washing, silicic acid can be obtained, if necessary, by making it into sodium silicate again, that is making it into silicate which is soluble in water, diluting it suitably with aqueous solution and filtering to remove foreign matter.

EXAMPLE 1

| | |
|---|---|
| Rice straw | 300 g. |
| Caustic soda | 39 g. (13% with respect to raw material). |
| Water | About 2,400 cc. |

When calculation is carried out with ash content of rice straw taken as 14% and 75% of the ash content is silicic acid, this becomes 31.5 g., which is about 10% of the rice straw.

The above were mixed in the proportion indicated and boiled in an autoclave and digested for 3 hours at 150° C.

After digestion was completed, the black liquor was removed while cooling. The black liquor was 3° Bé., 60° C. temperature and pH 11.5. This black liquor was concentrated to 7° Bé. and the temperature made 20° C. by cooling with water.

At the same time, glacial acetic acid (purity over 99%) was diluted with 2 times its quantity of aqueous solution and carbon dioxide gas absorbed at normal pressure and 5° C. to prepare a 3 cc. solution. The entire quantity of the above 3 cc. solution was added to 100 cc. of 20° C., 7° Bé. black liquor, temperature increased gradually by which the content first became sol form after about 30 minutes when the temperature became about 40° C., then became feather form and finally became gel form and the viscosity of the solution increased. This precipitate was separated from the black liquor by filtering, washed with water and dried, by which fine silicic acid powder having very soft touch was obtained.

This power is whitish grey due to a small quantity of adhered lignin and is weak alkaline. In order to obtain weak acidic powder, treatment with pH 5 hydrochloric acid is repeated to remove bonded sodium, washed with water and dried. In order to obtain white powder, together with the acid treatment process, the gel-like precipitate after water-washing was made pH 5 by adding hydrochloric acid, dissolved by adding 10 g. of sodium chlorite dissolved in water and maintained for 2 hours at 50° C., by which the adhered lignin dissolves and the solution becomes yellow. This was filtered, water washed and dried at 100° C. to remove the chlorine contained in it to obtain weak acidic, fine white powder.

Also, 100 cc. of 7° Bé. black liquor was taken and the temperature made 50° C. The aforementioned 3 cc. of acidic solution was added slowly over a period of about 50 minutes. It first became sol form, then feather form and finally get form and the viscosity of the liquid increased. This precipitate was separated from the black liquor by filtering, washed with water and dried, by which fine powder of silicic acid having very soft touch was obtained. This powder is whitish grey due to the small quantity of adhered lignin and is weak alkaline. In order to obtain weak acidic powder, treatment with pH 5 hydrochloric acid is repeated, washed with water and dried.

After the silicic acid has been precipitated, the reaction mixture was maintained at 10° Bé. while stirring and boiled for about 1.5 hour at 80° C. while adding water occasionally. The precipitate was separated from the black liquor by filtering, washed with water and dried, by which weak alkaline, light brown, fine powder having large particle size, high bulkiness, good dispersion property and low adsorbability was obtained. This was treated with pH 5 hydrochloric acid solution, washed with water and dried, by which weak acidic product was obtained.

If white product is required, a solution of hydrochloric acid is added to the gel-form precipitate after water washing with stirring to prepare a mixture of pH 5, 20 cc. (35%) of hydrogen peroxide is added to this and boiled for 1 hour at 70° C., by which the adhered lignin is liberated and floats to the surface of the solution, this is removed, washed with water and dried to obtain fine white powder. The particle diameter of this fine powder is large, bulkiness is high, moisture adsorbability is low and dispersion property is good, and are approximately the same as those of the fine, brown powder before treatment.

Next, examples of kind, concentration and quantity of treating reagent which is added, concentration and quantity of black liquor and reaction temperature are indicated.

(I) Reaction with acid (1) When 10 cc. of a solution obtained by diluting 10 cc. of hydrochloric acid (35% concentration) with 22 cc. of water is mixed with 200 cc. of 5° Bé. black liquor silicic acid precipitates at about 30° C. but alkali lignin salt does not precipitate. However, when 10 cc. of a solution obtained by diluting 10 cc. of hydrochloric acid with 10 cc. of water is mixed with the aforementioned black liquor, the alkali lignin salt reacts and precipitates. When the black liquor is concentrated to 10° Bé., alkali lignin salt does not precipitate and only silicic acid precipitates.

(2) When 10 cc. of a solution obtained by diluting 10 cc. of glacial acetic acid (over 99% concentration) with 20 cc. of water is mixed with 200 cc. of 5° Bé. black liquor, silicic acid precipitates at about 70° C. but alkali lignin salt does not precipitate. However, when 10 cc. of a solution obtained by adding 10 cc. of glacial acetic acid solution to 10 cc. of water is mixed with the aforementioned black liquor, alkali lignin salt reacts and precipitates but when mixed with black liquor which has been concentrated to 10° Bé., only silicic acid precipitates at about 30° C. and alkali lignin salt does not precipitate.

(3) When 10 cc. of hydrogen peroxide (30% concentration) solution is mixed with 200 cc. of 15° Bé. black liquor, only silicic acid precipitates at about 30° C.

(4) When 10 cc. of a solution obtained by diluting 10 cc. of phenol (over 98% concentration) or cresol with 10 cc. of water is mixed with 200 cc. of 15° Bé. black liquor, only silicic acid precipitates at about 30° C.

(5) When 15 g. of paraformaldehyde (over 80% content) dissolved in 20 cc. of water is mixed with 200 cc. of 15° Bé. black liquor, only silicic acid precipitates at about 70° C.

(II) Reaction with various metal salts (1) Silicic acid is obtained when alkali earth metal silicate is first formed and then decomposed with an acid. When 10 g. of calcium chloride ($CaCl_2 \cdot 2H_2O$) dissolved in 20 cc. of water is mixed with 200 cc. of 15° Bé. black liquor, calcium silicate precipitates at a temperature of about 30° C. Silicic acid is obtained when this is decomposed with hydrochloric acid solution, in a similar manner as mentioned above.

(2) When 10 g. of aluminum sulfate

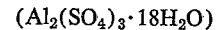
$$(Al_2(SO_4)_3 \cdot 18H_2O)$$

dissolved in 20 cc. of water is mixed with 200 cc. of 15° Bé. black liquor, aluminum hydroxide and silicic acid precipitate at about 30° C.

(3) Only a very small quantity of silicic acid or none is formed with alkali salt, with the exception of acidic salt of alkali salt. Silicic acid is precipitated by sodium hydrogen carbonate ($NaHCO_3$), sodium hydrogen sulfate ($NaHSO_4 \cdot H_2O$) or disodium hydrogen phosphate

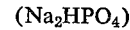
$$(Na_2HPO_4)$$

which are acidic salts of dibasic acid alkali salt but only a small quantity is precipitated by sodium carbonate ($Na_2CO_3$) and sodium sulfate ($Na_2SO_4 \cdot 10H_2O$).

When 10 g. of sodium hydrogen carbonate, sodium hydrogen sulfate or disodium hydrogen phosphate dissolved in 20 cc. of water is mixed with 200 cc. of 15° Bé. black liquor, silicic acid precipitates at about 30° C. but almost no precipitate is formed when 10 g. of sodium carbonate or sodium sulfate dissolved in 20 cc. of water is mixed.

(III) Reaction with ammonia water and ammonium salt (1) When 200 cc. of ammonia water ($NH_4OH$) of 28% concentration is mixed with 200 cc. of 15° Bé. black liquor, a cloudy precipitate is formed at a temperature of about 40° C., this solidifies when the temperature is increased up to about 70° C. and it is believed that ammonium silicate is produced but when washed with water because it is colored black by adherence of lignin, it is difficult to collect the silicic acid as ammonia vaporizes.

(2) When 10 g. of ammonium sulfate $(NH_4)_2SO_4$ dissolved in 20 cc. of water is mixed with 200 cc. of 15° Bé. black liquor, only silicic acid precipitates at a temperature of about 30° C.

(IV) Reaction with lime water of alkali earth metals which have stronger alkalinity than alkali metals of alkali metal silicate (1) When 10 g. of slaked lime is mixed with 200 cc. of 15° Bé. black liquor, calcium silicate precipitates at a temperature of about 70° C. This can be made into silicic acid by decomposing with hydrochloric acid as mentioned above.

EXAMPLE 2

Rice straw _____ 300 g.
Caustic soda _____ 30 g. (10% with respect to raw material).
Glacial acetic acid ____ 9 cc.
Water _____ 2,400 cc.

3° Bé. black liquor produced by digesting the above mixed in the above-mentioned proportion for about 3 hours at 150° C. is concentrated to 7° Bé. and separated with a centrifuge, by which it will be possible to separate and collect from the black liquor silicic acid formed by decomposition in the autoclave. When this is washed with water and dried, fine, whitish grey powder having very good soft touch is obtained. Depending on the concentration and quantity of the acid added, not only silicic acid can be separated from the alkali metal silicate in the black liquor but also alkali lignin salt can be prevented from reacting and precipitating.

EXAMPLE 3

Rice straw _____ g__ 300
Glacial acetic acid _____ cc__ 9
Water _____ cc__ 2,400

The above are mixed in the proportion indicated, digested for 1 hour 30 minutes at 120° C., hemicellulose removed, the raw material digested again with 39 g. of caustic soda and 2,400 cc. of water for 3 hours at 150° C., and the 3° Bé. black liquor produced is concentrated to 10° Bé. black liquor.

10 cc. of a solution prepared by diluting 10 cc. of glacial acetic acid with 20 cc. of water is mixed with 200 cc. of the 10° Bé. black liquor, by which silicic acid can be separated from sodium silicate at a temperature of about 30° C. The effect is not very large even if hemicellulose dissolved in alkali is not present in the black liquor.

EXAMPLE 4

Rice straw ____ 300 g.
Caustic soda __ 30 g. (10% with respect to raw material).
Slaked lime ___ 9 g. (3% with respect to raw material).
Water _____ 2,400 cc.
Digestion time _ 6 hours at 150° C.

First, when the raw material reacts with caustic soda to form sodium silicate and this reacts with slaked lime to form calcium silicate, the organic substances in the black liquor is harmonized and coprecipitated to produce brown complex of calcium silicate and coprecipitated organic substance, these are separated from the black liquor, washed with water and treated in accordance with Example 5.

Also, similar result can be obtained by digesting with 9 g. of calcium chloride (3% with respect to raw material) or 39 g. of caustic soda (13% with respect to raw material) in place of slaked lime.

EXAMPLE 5

Rice straw ____ 300 g.
Caustic soda __ 15 g. (5% with respect to raw material).
Slaked lime ___ 24 g. (8% with respect to raw material).
Water _____ 2,400 cc.
Digestion time _ 9 hours at 150° C.

First, the reaction mixture produced is filtered to remove fine pulp particles and other foreign matters. Next, the black liquor is concentrated to 5° Bé., black liquor and the precipitate separated with a centrifuge and the black alkali lignin salt which adheres to the precipitate removed by washing with water to obtain yellowish brown slurry. This is a complex of calcium silicate and organic substance which has harmonized and coprecipitated during its formation. There is almost no undissolved slaked lime and a result which is better than the case when slaked lime is used independently can be obtained.

This slurry is made pH 5° and 30° C. by adding hydrochloric acid of 5% concentration, by which the color of the slurry changes from yellowish brown to brown, also the fine particles become aggregates, the apparent specific gravity becomes smaller and filtering property improves further. That is, a complex of silicic acid and organic substance or a complex of silicic acid, calcium silicate and organic substance is obtained by adjusting the quantity of the hydrochloric acid added. Even if a small quantity of undissolved slaked lime is present, this can be removed by making it into soluble calcium chloride. Also, if necessary, white powder can be obtained by making pH 4 with acid treatment and adding 10 g. of sodium chlorite and maintaining this for 2 hours at 60° C. by which the organic substance dissolves and the solution becomes yellow, and this is filtered, washed with water and dried at 100° C. to expel chlorine.

Similar result can be obtained by using nitric acid, acetic acid or their ammonium salts which react with alkali earth metal silicate to form soluble salt in place of hydrochloric acid.

Furthermore, complex of silicic acid, calcium carbonate and organic substance is formed when reacted with carbon dioxide gas.

When the above substance is filtered, washed with water and dried, filler for reinforcing rubber which has superior dispersion property can be obtained.

EXAMPLE 6

Rice straw ____ 300 g.
Slaked lime ___ 39 g. (13% with respect to raw material).
Water _____ 2,400 cc.
Digestion time _ 12 hours at 150° C.

The black liquor produced is filtered to remove foreign matter and concentrated to 4° Bé. The precipitate is separated from the black liquor with a centrifuge, filtered and washed with water to obtain yellowish brown slurry. This is a complex of calcium silicate and coprecipitated organic substance containing a small amount of undissolved slaked lime. Compared with Example 5, the quantities of black alkali lignin salt and complex obtained are smaller.

Good quality pulp can be obtained and recovery of complex of calcium silicate and organic substance is good when stoichiometric quantities of caustic soda and calcium chloride are reacted, the fine slaked lime produced is washed with water to remove salts and used in digestion, and a very small quantity of undissolved slaked lime is present, and although this does not have any change on the quantity of black alkali lignin salt produced. This complex is treated with acid or its ammonium salt or with carbon dioxide gas in accordance with Example 5.

As explained above, in this invention not only are silicic acid and silicates recovered from black liquor containing silicates which are produced during pulp manufacture from plants containing silicic acid such as plants of the gramineae family and has been discharged as waste liquid but also it succeeded in providing a process for manufacturing silicic acid, silicate and complex of lignin substance and silicic acid which can be used as reinforcing pigment for use as filler for rubber and pigment for other uses by utilizing the black liquor by decomposition and formation reaction of silicate in black liquor. As plants, particularly straws of agricultural crops which are harvested every year are utilized so that the resource is unlimited and fine white powder which can be used as it is without any further processing can be obtained. This invention also provides means for producing pigment from black liquor by utilizing silicate from outside the system also. Consequently, the content of inorganic foreign matter is smaller when compared with the previous silica stone, silica sand or clay used for producing silicate; there is no necessity of the mechanical crushing process or chemical treatment process; and moreover metal salts, surfactants, etc. which were previously used for obtaining silicic acid gel which is more useful as pigment from silicate become entirely unnecessary.

As is apparent from the above explanation, this invention makes it possible to obtain cheap silicic acid pigment and reduce the overall cost of pulp manufacture substantially as plants which contain silicic acid such as plants of the gramineae family are used as the raw material.

What is claimed is:

1. A process for recovering silicic acid and silicates in an alkaline state from black liquor containing water-soluble silicates, which comprises admixing black liquor having a silicic acid and/or silicates content ranging from 10 to 100 g./l. with a substance having stronger acidity than silicic acid to form a reaction mixture and thereby causing silicic acid or silicates to precipitate, said precipitate being substantially free of alkali lignin salt and recovering the precipitate of silicic acid or silicates.

2. A process in accordance with claim 1 including the step of adjusting the pH of the reaction mixture to over 8.

3. A method in accordance with claim 1 wherein the silicic acid or silicates is precipitated after the black liquor is employed in a pulp digesting process.

4. A process for recovering silicic acid and silicates in an alkaline state from black liquor containing water-soluble silicates, which comprises admixing black liquor having a silicic acid and/or silicates content ranging from 10 to 100 g./l. with a substance having a stronger alkalinity than the alkali used for digestion, or salts thereof, to form a reaction mixture and thereby causing silicic acid or silicates to precipitate, said precipitate being substantially free of alkali lignin salt and recovering the precipitate of silicic acid or silicates.

5. A process for forming a complex formed from a lignin substance and silicic acid useful as pigment or filler for rubber, which comprises admixing slaked lime and black liquor containing silicic acid or silicates to form an aggregate, treating the aggregate with a member selected from the group consisting of (a) an acid or (b) ammonium salt to form a complex of silicate and a lignin substance or (c) carbon dioxide gas to form a complex of silicic acid, calcium carbonate and a lignin substance, and recovering the resulting complex.

References Cited
UNITED STATES PATENTS

| | | | |
|---|---|---|---|
| 1,716,623 | 6/1929 | Collins | 106—123 R |
| 1,908,862 | 5/1933 | Reese | 106—123 R |
| 1,977,728 | 10/1934 | Leach | 106—123 R |
| 2,644,748 | 7/1953 | Cunningham | 106—123 R |
| 2,680,113 | 6/1954 | Adler et al. | 106—123 R |
| 2,727,028 | 12/1955 | Russell et al. | 106—123 R |

JAMES E. POER, Primary Examiner

U.S. Cl. X.R.

106—306